United States Patent [19]

Ashling

[11] 4,177,925
[45] Dec. 11, 1979

[54] HEATER ADAPTER FOR IMPROVED AUTOMOBILE HEATER PERFORMANCE

[76] Inventor: Lloyd W. Ashling, 10101 Lyndale Ave. South, #212, Bloomington, Minn. 55420

[21] Appl. No.: 916,746

[22] Filed: Jun. 19, 1978

[51] Int. Cl.² ............................................. B60H 1/02
[52] U.S. Cl. ............................ 237/12.3 B; 123/41.09; 123/41.51
[58] Field of Search ............... 237/12.3 B; 123/41.09, 123/41.51, 41.1

[56] References Cited

U.S. PATENT DOCUMENTS

| 1,849,934 | 3/1932 | Kirsch | 237/12.3 B X |
| 1,989,163 | 1/1935 | Beck et al. | 237/12.3 B X |
| 2,259,341 | 10/1941 | Hans | 237/12.3 B X |
| 2,300,841 | 11/1942 | Raney | 237/12.3 B X |
| 3,211,374 | 10/1965 | Matulaitis | 237/12.3 B X |
| 3,262,534 | 7/1966 | Monroe et al. | 123/41.09 X |
| 3,636,935 | 1/1972 | Martens | 237/12.3 B X |
| 3,782,704 | 1/1974 | Schramm et al. | 285/156 X |
| 3,888,412 | 6/1975 | Lindo | 237/12.3 B |

Primary Examiner—William F. O'Dea
Assistant Examiner—William E. Tapolcai, Jr.
Attorney, Agent, or Firm—Kinney, Lange, Westman and Fairbairn

[57] ABSTRACT

An adapter improves the performance of the heater system in certain automobiles such as 1974-1978 Ford Pinto and Mustang II cars equipped with the 2300cc engines. An adapter is connected between the engine and the thermostat to permit coolant (i.e. water and "anti-freeze") to be routed from near the thermostat directly to the heater core inlet. This permits the coolant having the highest temperature within the engine to be provided to the heater core, thereby significantly increasing the available heat output of the heater core.

4 Claims, 7 Drawing Figures

HEATER ADAPTER FOR IMPROVED AUTOMOBILE HEATER PERFORMANCE

BACKGROUND OF THE INVENTION

The present invention relates to systems for heating the interior of a vehicle. In particular, the present invention is an improvement to heating systems in certain vehicles such as the 1974-78 Ford Pinto and Mustang II automobiles equipped with 2300 cc engines.

The 1974-78 Ford Pinto and Ford Mustang automobiles equipped with the 2300 cc engines (and the comparable Mercury automobiles) have exhibited chronic poor heating performance, particularly when operated in cold climates. During cold weather conditions, the heaters of these automobiles are slow to provide heat to the passenger compartment and often provide inadequate heat even after the car has been running for an extended period of time.

The coolant flow in these vehicles is generally as follows: The coolant is picked up at about mid-engine head and then is routed through an aluminum intake manifold. The coolant passes out of the aluminum intake manifold through an outlet and is then routed through the automatic choke and finally by metal tubing and rubber hose to the heater core. The remaining heat in the coolant is then dissipated, and the coolant is returned to the engine water pump by way of metal tubing and rubber hose. As a result of this coolant circulation arrangement, the coolant which is supplied to the heater core already has had a substantial amount of heat dissipated from it. The output of the heater is, of course, limited by the amount of heat which can be extracted from the coolant.

SUMMARY OF THE INVENTION

In the present invention, the coolant flow within the system is rerouted to increase the heat output of the heater core. The present invention includes adapter means which is connected between a first engine coolant passage outlet and the thermostatic valve. The adapter means has an auxiliary outlet which permits coolant to flow from the engine. Means such as a rubber hose connects the auxiliary outlet to the heater core inlet.

In those engines having an automatic choke mechanism which requires that coolant be routed through the choke mechanism, the present invention further includes a "T" connector having first, second and third legs. A first hose connects the heater core outlet and the first leg; a second hose connects the coolant pump inlet and the second leg; and a third hose connects the automatic choke mechanism outlet and the third leg. The third leg preferably includes a restricting orifice which restricts the flow of coolant through the choke mechanism and ensures a maximum flow of hotter coolant through the heater core.

In those engines having an electrical automatic choke, a plug is provided to plug the outlet on the intake manifold from which coolant was previously supplied to the heater core.

As a result of the present invention, coolant is derived from the location where it has its maximum heat content (i.e. immediately proximate the thermostatic valve). This coolant is routed directly to the heater core to maximize the possible output of the heater core. Significant improvement in heater performance has been obtained using the adapter of the present invention.

DETAILED DESCRIPTION OF THE PREFERRED EMBODIMENTS

Figure 1:
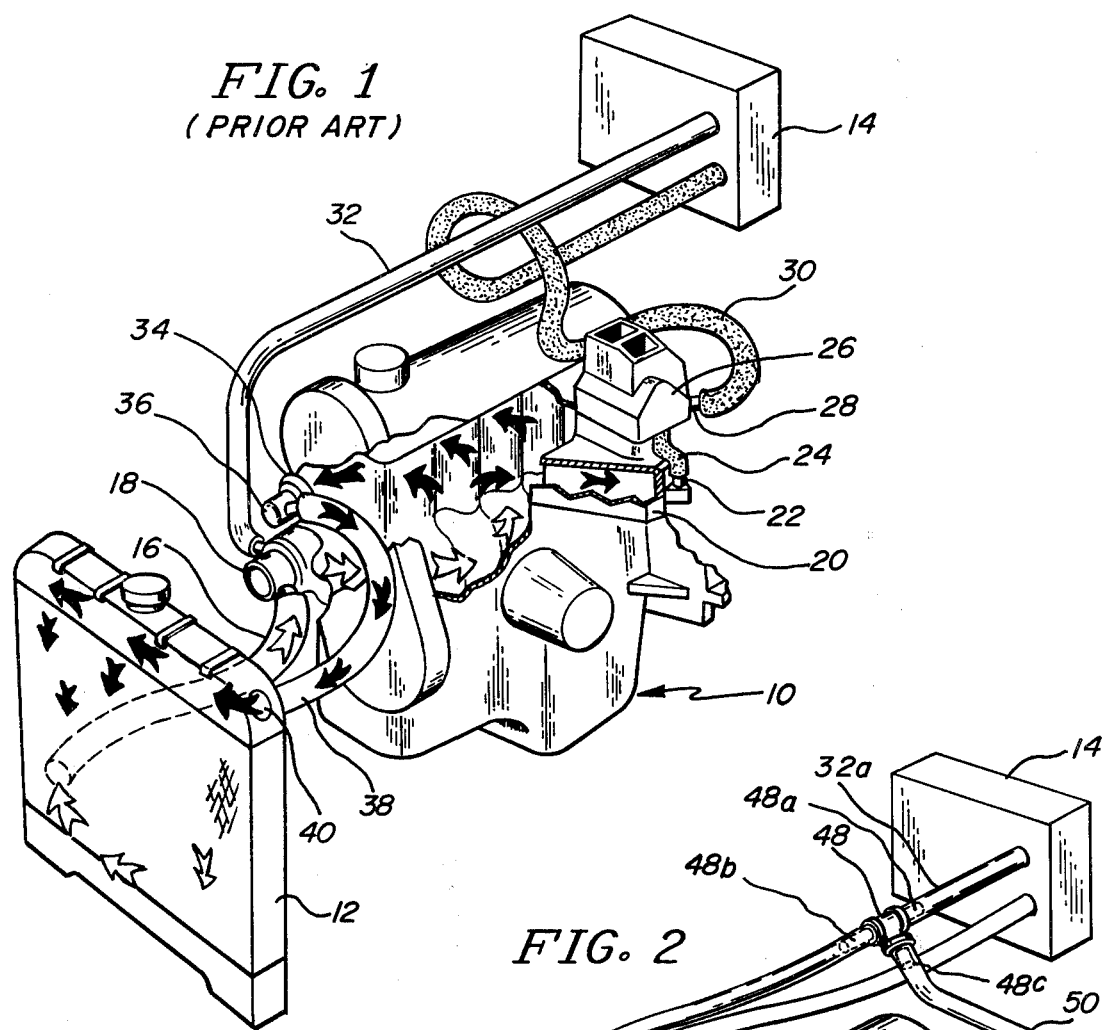
FIG. 1 is a pictoral view showing a prior art vehicle engine and heater system.

FIG. 1 shows a prior art automobile engine 10, radiator 12, and heater 14 such as used in the Ford Pinto, Ford Mustang II, Ford Fairmont and Mercury Bobcat, with 2300 cc engine. Engine 10 has been partially broken away to illustrate the flow of coolant throughout the engine. As shown in FIG. 1, coolant from near the bottom of radiator 12 is supplied through hose 16 to waterpump 18. The coolant supplied is relatively cool comparatively, and is designated by open arrows. The coolant is circulated within the engine block.

Hot coolant (designated by the solid arrows) passes out of the engine block, through passages in aluminum intake manifold 20, to an outlet 22 located about midway from the front to the rear of the engine. The coolant is then routed from outlet 22 through flexible tubing 24 to automatic choke mechanism 26. The coolant is then routed out of outlet 28 and through metal and flexible tubing 30 to the inlet of heater 14. The heat content within the coolant is dissipated in the heater core of heater 14 and then is returned to water pump 18 through tubing 32.

The coolant within engine 10 with the highest temperature is generally found near engine block outlet 34, at which is located a thermostat (not shown in FIG. 1). The thermostat controls the flow of the hot water out of outlet 34 through connector 36 and hose 38 to radiator inlet 40 near the top of radiator 12.

It can be seen that a considerable amount of the heat in the coolant is dissipated during the flow of coolant from the engine block through manifold 20, through hose 24, automatic choke mechanism 26, and tubing 30 before it reaches the core of heater 14. This results in chronic poor heater performance in automobiles such as the Ford Pinto, Ford Mustang II, and Mercury Bobcat equipped with the 2300 cc engine.

Figure 2:
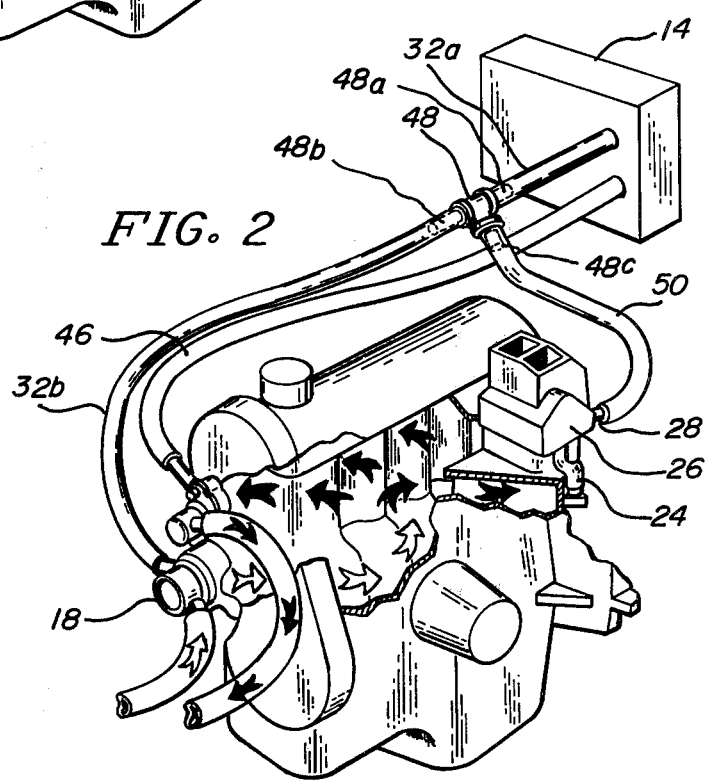
FIG. 2 shows the pictoral view of a vehicle engine and heater system similar to that of FIG. 1, but modified in accordance with the present invention.
Figure 3:
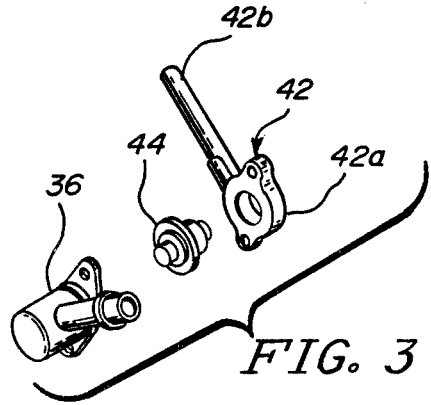
FIG. 3 is an exploded view showing the coolant outlet, the thermostat and the heater adapter of the present invention.
Figure 4:
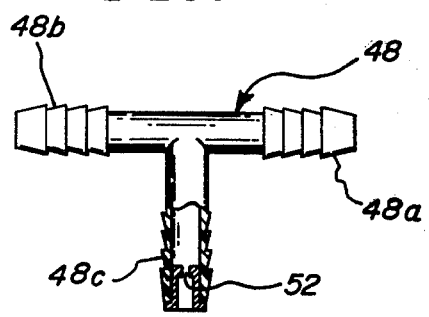
FIG. 4 shows the "T" connector used in the embodiment of the present invention shown in FIG. 2.

One preferred embodiment of the present invention is illustrated in FIGS. 2-4. The present invention is a modification of the system shown in FIG. 1, and similar numerals are used to designate similar elements.

In the embodiment shown in FIG. 2, a heater adapter 42 is inserted between outlet 34 of the engine block and thermostat 44. Connector 36 and thermostat 44 are mounted to heater adapter 42, as best shown in exploded view shown in FIG. 3.

Heater adapter 42 includes flange 42a and an auxiliary outlet 42b. Coolant is permitted to flow out of outlet 34 in the block, through flange 42a, to thermostat 44. In addition, outlet 42b communicates with the central opening of flange 42a so that coolant can flow from the engine block through outlet 34 and out auxiliary outlet 42b, even when the thermostat 44 is closed.

Hose 46 connects auxiliary outlet 42b and the inlet of heater 14. As a result, the highest temperature coolant within the engine block, i.e. the coolant closest to thermostat 44, is derived from the engine block by heater adapter 42 and is supplied through auxiliary outlet 42b and hose 46 to heater 14.

As shown in FIG. 2, return hose 32 is cut in two or is replaced by two new segments, 32a and 32b. Segment 32a connects the outlet of heater 14 to first leg 48a of "T" connector 48. Section 32b connects second leg 48 of "T" connector 48 to an inlet of waterpump 18. The third leg 48c of "T" connector 48 is connected to outlet 28 of the automatic choke mechanism by metal and flexible tubing 50. In some cases, metal and flexible tubing 30 of FIG. 1 may be converted to metal and flexible tubing 50 by merely cutting off a part of the flexible tubing to make it shorter.

FIG. 4 shows a preferred embodiment of "T" connector 48, in which a restricting orifice 52 is provided in third leg 48c. This restricts the flow of coolant from outlet 22 through hose 24, through choke mechanism 26, outlet 28 and through tubing 50. The amount of coolant that is permitted to flow is just that required to provide adequate operation of the automatic choke. The orifice 52 ensures that maximum flow of hotter coolant is through hose 46 to the inlet of heater 14 and from the outlet of heater 14 through hose sections 32a and 32b and the main two legs 48a and 48b of "T" connector 48. Operation of the choke mechanism is unchanged by this rerouting of the coolant flow.

In a preferred embodiment of the present invention, flange 42a of heater adapter 42 has a ½" thickness. The central opening of flange 42a has an inside diameter of 1⅝". Holes are provided at opposite ends of flange 42a on 2⅝" centers, which match the holes used for bolting the existing connector 36 to the engine block.

The auxiliary outlet 42b is preferably a ⅝" pipe which is connected to the side of flange 42a. An opening through the side of flange 42a is provided so that the pipe 42b communicates with the central opening of flange 42a and coolant flows out of the adapter through the ⅝" pipe.

Figure 5:
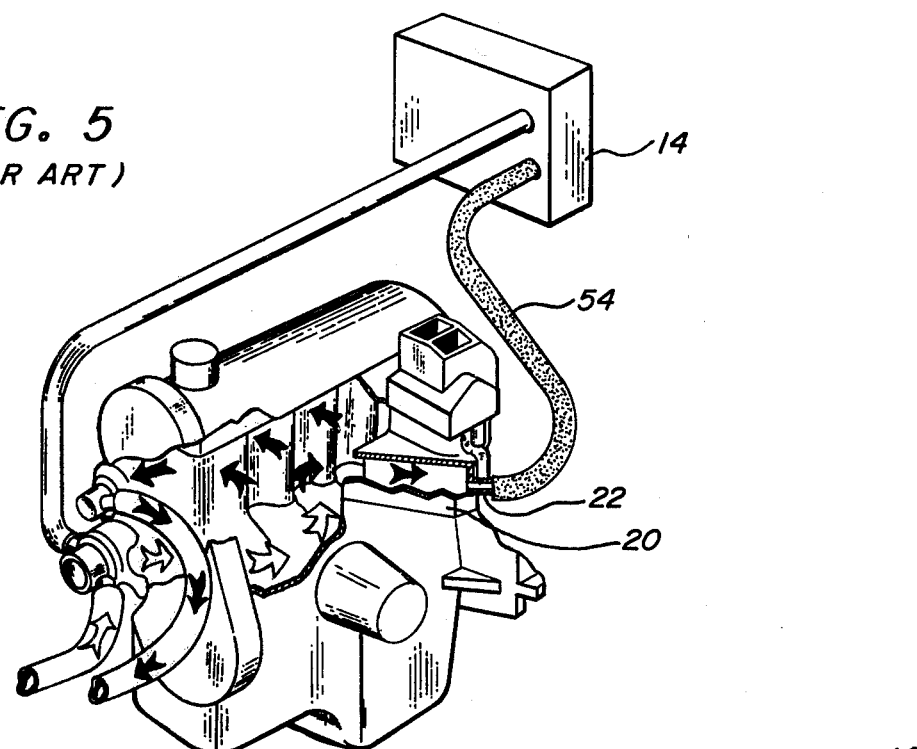
FIG. 5 is a pictoral view of a prior art vehicle engine and heater system, similar to that shown in FIG. 1 except that an electric rather than a water-heated automatic choke is provided.

FIG. 5 illustrates another prior art arrangement, which was used on 1977 models of Ford Mustang II and Ford Pinto. On these models, an electric choke is used, so that coolant is not routed through the choke mechanism.

FIG. 5 illustrates this arrangement, with similar numbers to those used in FIG. 1 being used to designate similar elements. The only change in the routing of coolant in the embodiment shown in FIG. 5 is that the coolant is provided directly from outlet 22 on intake manifold 20 through tubing 54 to the inlet of heater 14. Otherwise, the coolant circulation is identical to that shown in FIG. 1. As in the system shown in FIG. 1, this system suffers from poor heating because a great deal of heat has been dissipated from the coolant before it reaches heater 14.

Figure 6:
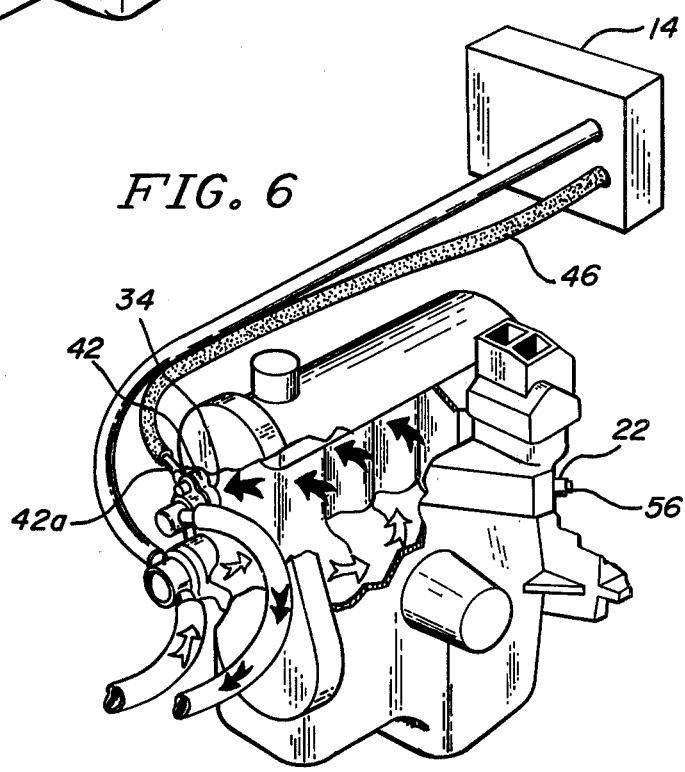
FIG. 6 is a pictoral view of another embodiment of the present invention modifying the engine and heater system shown in FIG. 5.

FIG. 6 illustrates the modified heater system using the heater adapter of the present invention. In the embodiment shown in FIG. 6, heater adapter 42 is once again inserted between connector 36 (and thermostat 44 not shown in FIG. 6) and outlet 34. Once again, the coolant with the highest temperature available within the engine block is routed through tubing 46 to the inlet of heater 14. This assures the greatest possible amount of heat transfer in heater 14. The other modification of the engine and heater system shown in FIG. 6 is the use of plug 56, which plugs outlet 22. Because coolant for heater 14 is now being derived from auxiliary outlet 42a, outlet 22 is no longer needed and can be plugged by plug 56. Alternatively, if desired, outlet 22 may be connected to hose 32 by means of a "T" connector in a similar manner to the connection of outlet 28 in FIG. 2.

Figure 7:
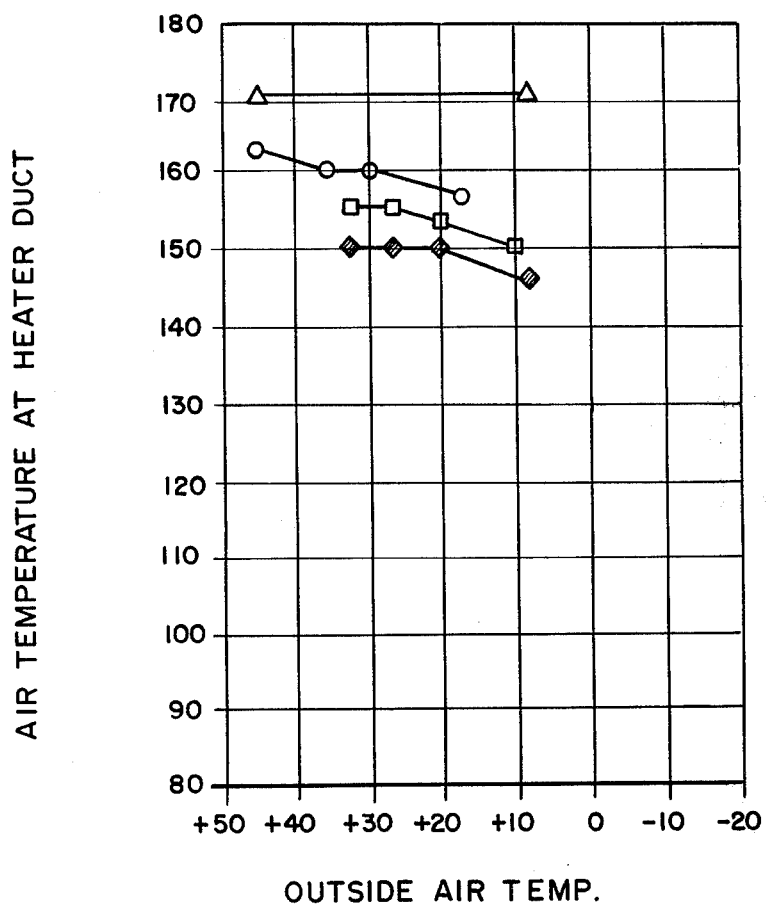
FIG. 7 is a graph showing comparative test results of a 1975 Ford Pinto with 2300 cc engine, with and without the heater adapter of the present invention.

The present invention has provided significant improvement in the operation of the heater. Table 1 and FIG. 7 illustrate the results of tests performed on a 1975 Ford Pinto with 2300 cc engine, both with the standard heater system and using the heater adapter of the present invention. To test the performance, the output air temperature at the heater duct was measured with blower control selecting the second to top blower speed and the heat control being in the maximum temperature position. These measurements were made at various outside air temperatures after 10 minutes of driving at 55 m.p.h. and after 20 minutes of driving at 55 m.p.h. The present invention yielded air temperatures from the heater duct which were significantly higher than those available with the standard heater system. After 20 minutes of driving at 55 m.p.h., the air temperature had stabilized at approximately 170° F. over a range of outside temperatures from about 17° F. to 45° F. The tests illustrate that the present invention provides quicker heat up and faster stabilization of temperature than was possible with the prior art heater system.

TABLE 1

| STANDARD | | | INVENTION | | |
|---|---|---|---|---|---|
| OUTSIDE TEMP. | DUCT TEMP. 10 MIN. | DUCT TEMP. 20 MIN. | OUTSIDE TEMP. | DUCT TEMP. 10 MIN. | DUCT TEMP. 20 MIN. |
| + 9° | 144° | 150° | +17° | 156° | 170° |
| +20° | 150° | 154° | +29° | 160° | 170° |
| +26° | 150° | 156° | +32° | 160° | 170° |
| +31° | 150° | 156° | +34° | 160° | 170° |
|  |  |  | +45° | 164° | 170° |

It can be seen that the present invention is extremely simple to install and uses a minimum of additional parts. Depending upon the condition of the various hoses, the installation of the present invention may involve the use of only three new parts. For example, in the embodiment shown in FIG. 2, the new parts are adapter 42, hose 46 and "T" connector 48. The main hoses 30 and 32 previously used may be cut to accommodate the "T"

connector 48. In the embodiment shown in FIG. 6, the new parts are adapter 42, hose 46 and plug 56.

In conclusion, the present invention is an effective modification of a heating system in automobiles such as the 1974-78 Ford Mustang II or Pinto, which overcomes a chronic poor heating problem, particularly in cold weather. The present invention is inexpensive and simple to install and uses a minimum of parts. It may be used as a kit for modifying existing automobiles, as well as a standard feature on new production automobiles.

Although the present invention has been described with reference to preferred embodiments, workers skilled in the art will recognize that changes may be made in form and detail without departing from the spirit and scope of the invention.

What is claimed is:

1. A method of improving heater performance of an automotive vehicle of the type having:
an internal combustion engine;
internal coolant passages in the engine and having a first coolant outlet and a coolant inlet,
an intake manifold mounted on the engine and communicating with the internal coolant passages and having a second coolant outlet;
a vehicle mounted radiator having an inlet and an outlet, the radiator inlet being connected to the first coolant outlet, a coolant pump connected between the radiator outlet and the coolant inlet of said engine to circulate liquid engine coolant through the engine between the coolant inlet and the first and second coolant outlets;
a vehicle mounted heater core having an inlet and an outlet, a first conduit connecting the heater core outlet to the coolant pump inlet, a second conduit normally causing the heater core inlet to receive coolant from the second coolant outlet;
a thermostatic valve connected to the engine and adjusted to control coolant flow from the first coolant outlet, the thermostatic valve being closed at temperatures below a predetermined value to prevent coolant flow through the radiator and opening in response to temperatures above the predetermined value to permit a controlled flow of coolant through the radiator;
the method comprising:
connecting a detachable fitting to the first coolant outlet with an auxiliary outlet between the first coolant outlet and the thermostatic valve,
and providing a fluid connection directly from the auxiliary outlet of said fitting to the heating core inlet independently of the second conduit so that heated fluid from the engine is supplied directly to the heater core rather than merely through the intake manifold.

2. The method of claim 1 wherein the automotive vehicle is of the type in which the second coolant outlet is normally connected to an inlet of an automatic choke mechanism and an outlet of the automatic choke mechanism is connected to the heater core inlet, the method further comprising:
disconnecting the outlet of the automatic choke mechanism and the heater core inlet;
connecting the outlet of the automatic choke mechanism to a first leg of a "T" connector; and
connecting the other two legs of the "T" connector in a coolant flow path between the heater core outlet and the coolant pump.

3. The method of claim 2 wherein the first leg of the "T" connector has a restricting orifice for restricting coolant flow from the outlet of the automatic choke mechanism.

4. The method of claim 1 in which the second cooling outlet is connected to the first conduit leading from the heater core outlet rather than to the heater core inlet.

* * * * *